(12) United States Patent
Makino et al.

(10) Patent No.: US 9,083,165 B2
(45) Date of Patent: Jul. 14, 2015

(54) ELECTRIC JUNCTION BOX

(71) Applicant: Yazaki Corporation, Tokyo (JP)

(72) Inventors: Masahiro Makino, Makinohara (JP);
Kouji Ueyama, Makinohara (JP)

(73) Assignee: Yazaki Corporation, Tokyo (JP)

( * ) Notice: Subject to any disclaimer, the term of this patent is extended or adjusted under 35 U.S.C. 154(b) by 52 days.

(21) Appl. No.: 14/088,745

(22) Filed: Nov. 25, 2013

(65) Prior Publication Data
US 2014/0151113 A1    Jun. 5, 2014

(30) Foreign Application Priority Data

Nov. 30, 2012    (JP) ................................. 2012-262084

(51) Int. Cl.
*H02G 3/08* (2006.01)
*H01H 9/04* (2006.01)
*H01H 9/02* (2006.01)

(52) U.S. Cl.
CPC ................ *H02G 3/088* (2013.01); *H01H 9/04* (2013.01); *H01H 9/02* (2013.01); *H02G 3/08* (2013.01)

(58) Field of Classification Search
CPC ......... H02G 3/08; H02G 3/081; H02G 3/088; H02G 3/16; H05K 5/00; H05K 5/02; H05K 5/04; B60R 16/00; B60R 16/0239; B60R 16/02; H01H 9/02; H01H 9/04

USPC .................... 174/50, 520, 59, 535, 559, 560; 439/76.1, 76.2, 949, 535; 361/600, 361/601, 679.01, 730, 752

See application file for complete search history.

(56) References Cited

U.S. PATENT DOCUMENTS

| | | | | |
|---|---|---|---|---|
| 5,674,090 A | * | 10/1997 | Sumida et al. ................ | 439/535 |
| 6,455,768 B2 | * | 9/2002 | Negishi ............................ | 174/50 |
| 7,671,275 B2 | * | 3/2010 | Kubota ............................ | 174/50 |
| 8,420,931 B2 | * | 4/2013 | Soh et al. ......................... | 174/50 |
| 8,785,775 B2 | * | 7/2014 | Takeuchi et al. ................ | 174/50 |
| 8,878,059 B2 | * | 11/2014 | Makino ............................ | 174/50 |
| 8,941,009 B2 | * | 1/2015 | Makino et al. .................. | 174/50 |

FOREIGN PATENT DOCUMENTS

JP    2005-261048 A    9/2005

* cited by examiner

*Primary Examiner* — Angel R Estrada
(74) *Attorney, Agent, or Firm* — Locke Lord LLP (57) ABSTRACT

Provided is an electric junction box which prevents highly-pressured water invading into a case from blowing to components in the case. The electric junction box includes a case including a frame to which a plurality of components is to be attached, a lower cover arranged to be attached to the frame. The frame includes a first side wall. The lower cover includes a second side wall and a flange. An upper end of the second side wall is positioned inside the first side wall, and a lower end of the first side wall abuts onto the flange. An outer face of the second side wall above the flange includes a parallel face and a tapered face. The parallel face has a length of 3 mm or more, and the tapered face has a length of 3 mm or more.

2 Claims, 7 Drawing Sheets

ELECTRIC JUNCTION BOX

This application is on the basis of Japanese Patent Application NO. 2012-262084, the contents of which are hereby incorporated by reference.

TECHNICAL FIELD

This invention relates to electric junction boxes to be mounted to automobiles.

BACKGROUND ART

To the automobile an electric junction box is mounted. The electric junction box has various types of structures, for example, the one provided with a case 301 shown in FIG. 5, which is well known (see PTL 1).

Figure 5:
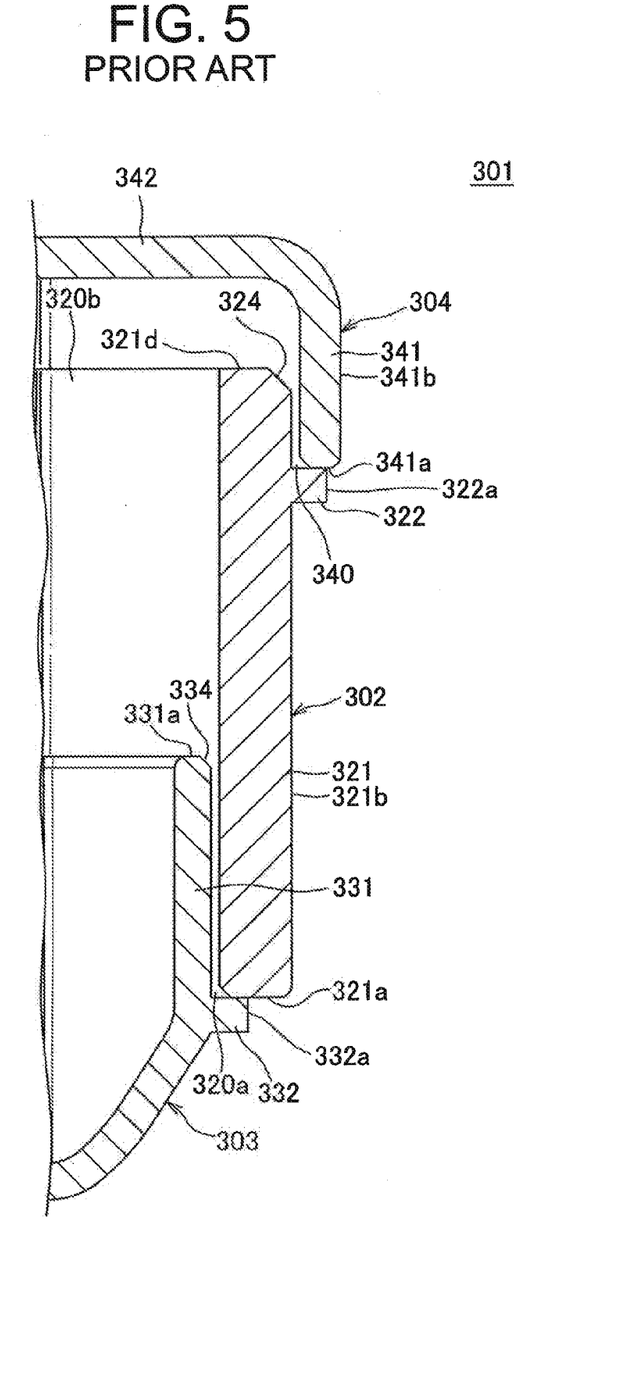
FIG. 5 is a cross-sectional view illustrating a conventional electric junction box.

As shown in FIG. 5, the foregoing electric junction box 301 includes a frame 302 to which a plurality of components is attached, a lower cover 303 and an upper cover 304 which are attached to the frame 302. These frame 302, lower cover 303, upper cover 304 are made of synthetic resin.

The foregoing frame 302 is provided with a side wall 321, an opening 320a surrounded by a lower end 321a of the side wall 321, an opening 320b surrounded by an upper end 321d of the side wall 321, and a flange 322 projecting from an outer face 321b of the side wall 321.

The lower cover 303 is designed to cover the opening 320a of a downside of the frame 302, and includes a bottom wall, a side wall 331, and a flange 332 projecting from the outer face of the side wall 331.

The upper cover 304 is designed to cover the opening 320b upside the frame 302, and includes a ceiling wall 342, and a side wall 341.

An upper end 331a of the side wall 331 of the lower cover 303 is positioned inside the side wall 321 of the frame 302, and the lower end 321a of the side wall 321 of the frame 302 abuts onto the flange 332. An upper end 321d of the side wall 321 of the frame 302 is positioned inside the side wall 341 of the upper cover 304, and the lower end 341a of the side wall 341 of the upper cover 304 abuts onto the flange 322.

Also, in order to readily attach the lower cover 303 to the frame 302, on the upper end 331a of the side wall 331 of the lower cover 303 is formed to include a tapered face 334. Likewise, in order to readily attach the upper cover 304 to the frame 302, on the upper end 321d of the side wall 321 of the frame 302 is formed to include a tapered face 324.

CITATION LIST

Patent Literature

[PTL 1]
Japanese Patent Application Laid-Open Publication No. 2005-261048

SUMMARY OF INVENTION

Technical Problem

Figure 6:
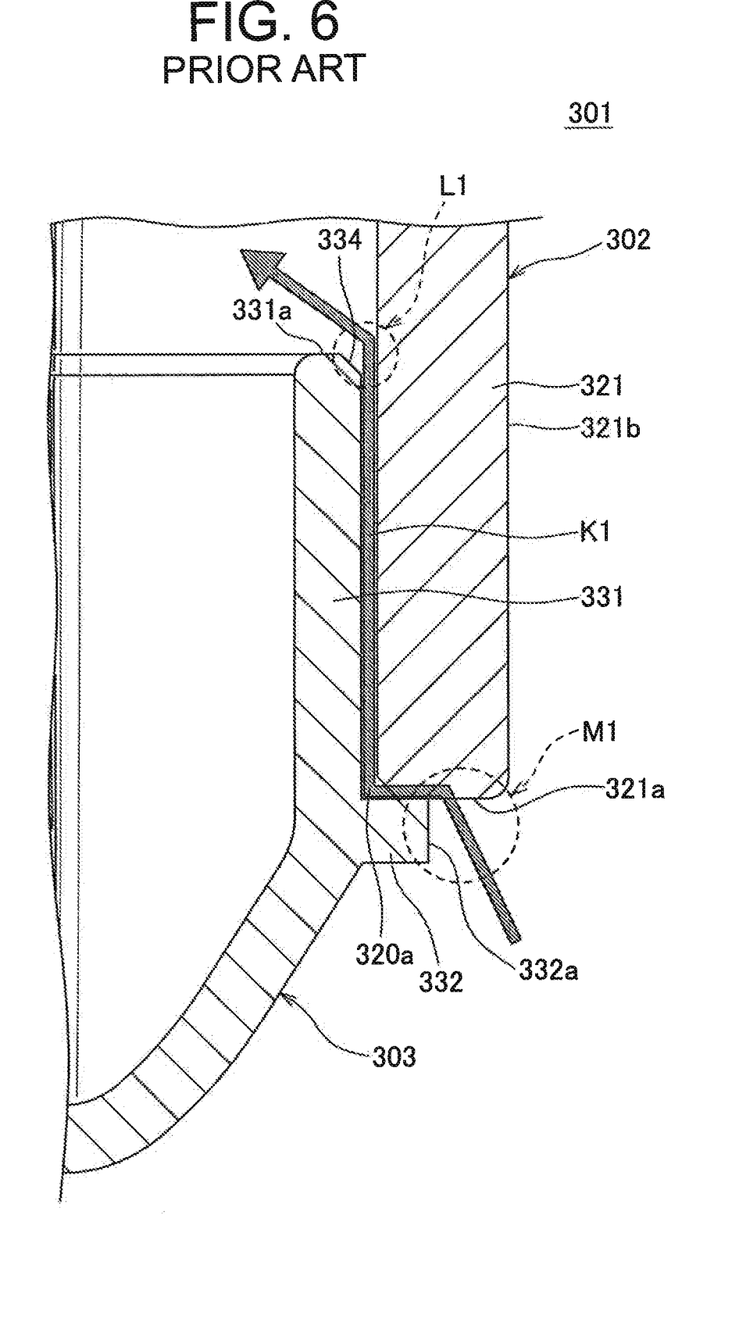
FIG. 6 is an explanatory view when highly pressured water is splayed to a case shown in FIG. 5.
Figure 7:
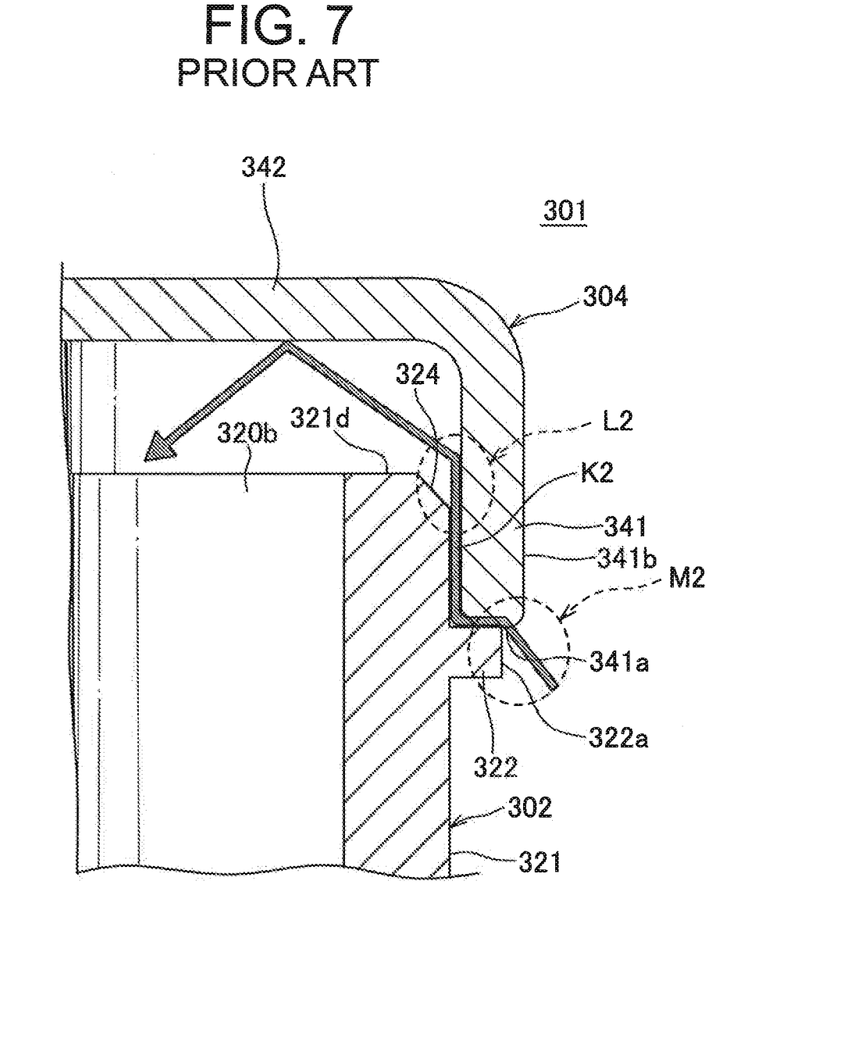
FIG. 7 is an explanatory view when highly pressured water is likewise splayed to a case shown in FIG. 5.

Disadvantageously, the above-mentioned electric junction box of the case 301 posed drawbacks mentioned below. Namely, as shown in FIGS. 6, 7, when the case is splayed with highly pressured water (for example, highly pressured washing water), water invades into between the frame 302 and the lower cover 303 as the arrow K1, or between the frame 302 and the upper cover 304 as the arrow K2, this water while keeping its high water pressure passes upwardly through a space between the side wall 321 and the side wall 331, or between the side wall 341 and the side wall 321, and blows in the case 301.

Also, when the water blows into the case 301 from the space between the side wall 321 and the side wall 331 or between the side wall 341 and the side wall 321, because an outlet of the space is narrow (which is shown by L1 in FIG. 6, or L2 in FIG. 7), keeping its high water pressure, the water blows upwardly toward an upside of case 301, and blows toward the components attached to the frame 302, or rebounds from the ceiling wall 342 to blow toward the components.

Furthermore, in the foregoing case 301 of the electric junction box, since between the tip end 332a of the flange 332 and the outer face 321b of the side wall 321 a step (a part shown by M1 in FIG. 6) is formed, and between the tip end 332a of the flange 322 and the outer face 341b of the side wall 341 a step (a part shown by M2 in FIG. 7) is formed, the pressured water splayed to the case 301 readily invades from these steps.

Solution to Problem

Therefore, an object of the invention is to provide an electric junction box to prevent highly pressured water, when invading into a case, from splashing onto components in the case.

According to one aspect of the invention in order to resolve the object, there is provided an electric junction box, including: a case including a frame to which a plurality of components is to be attached, a cover arranged to be attached to the frame, wherein one of the frame and the cover includes a first side wall, and an opening surrounded by a lower end of the side wall, wherein the other of the frame and the cover includes a second side wall, and a flange projecting from an outer face of the second side wall, wherein an upper end of the second side wall is positioned inside the first side wall, wherein the lower end of the first side wall abuts onto the flange, wherein the outer face of the second side wall above the flange includes a parallel face intersecting the flange and arranged parallel to an inner face of the first side wall, a tapered face slanted in a direction toward an inside of the second wall as approaching the upper end of the second side wall from an end of the parallel face located distant from the flange, wherein the parallel face has a length from an end of the flange to an end of the tapered face of 3 mm or more, wherein the tapered face has a length from the end of the parallel face to an upper end of the tapered face of 3 mm or more, and herein the upper end of the second wall and the inner face of the first side wall are spaced by 0.5 mm or more.

Preferably, a distal end of the flange located distant from the second side wall is positioned in the same plane as an outer face of the first side wall.

Advantageous Effects of Invention

According to the invention related to the one aspect, since the parallel face has the length from the end of the flange to the end of the tapered face of 3 mm or more, wherein the tapered face has the length from the end of the parallel face to the upper end of 3 mm or more, and wherein the upper end of the second wail and the inner face of the first side wall are spaced by 0.5 mm or more, the highly pressured water, when splayed to the case and invading from between the flange and the parallel face, a momentum of the water passing upwardly through the space between the parallel face and the first side wall is reduced between the tapered face and the first side wall, and thereby the water passing through between the upper end of the second side wall and the first side wall, without blowing upwardly upside the case, falls down toward downside of the case. Therefore, the water invading into the case is prevented from splashing onto the components attached to the frame.

According to the invention, since the distal end of the flange located distant from the second side wall is positioned in the same plane as the outer face of the first side wall, between the distal end of the flange and the outer face of the first side wall a step is not induced, making it possible that the highly pressured water when splayed to the case unlikely invades from between the flange and the first side wall.

DESCRIPTION OF EMBODIMENTS

First Embodiment

Figure 1:
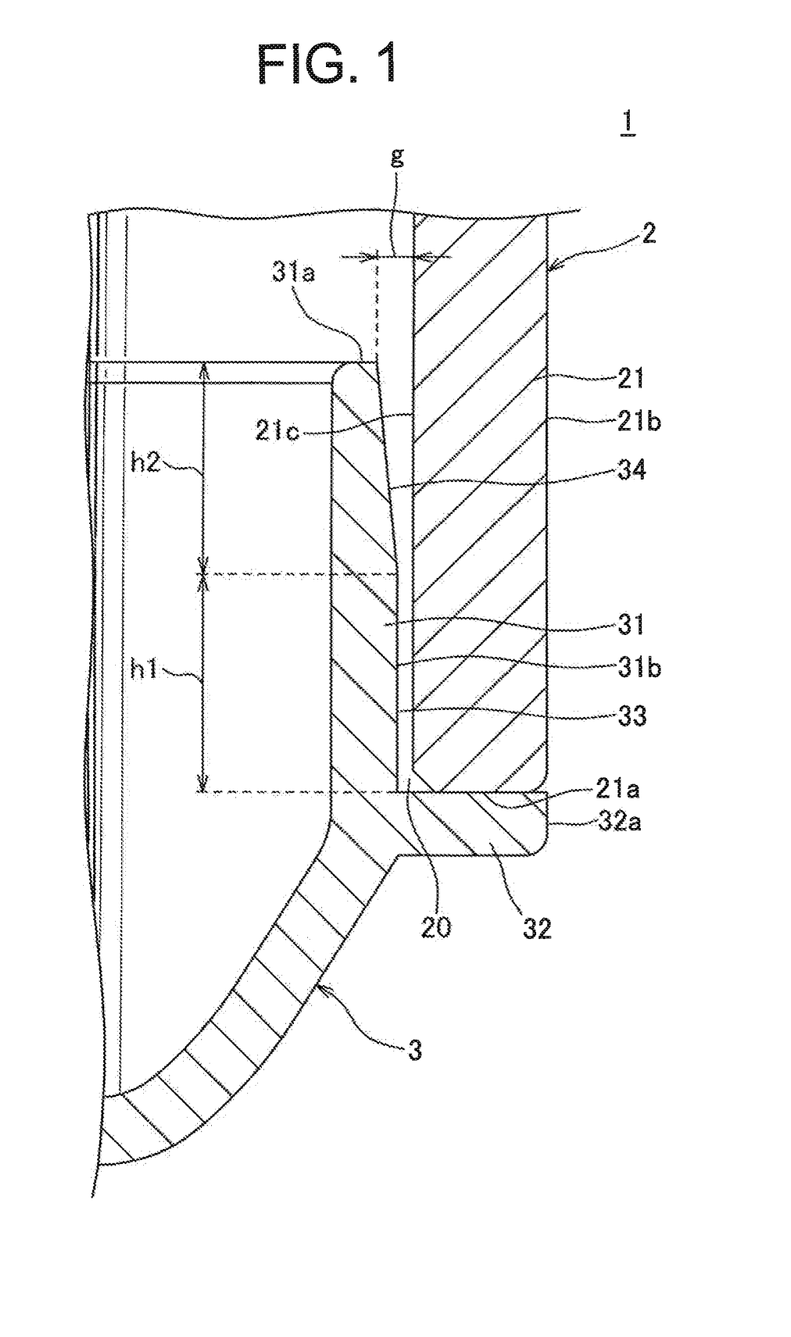
FIG. 1 is a cross-sectional view illustrating an electric junction box according to a first embodiment of the invention.
Figure 2:
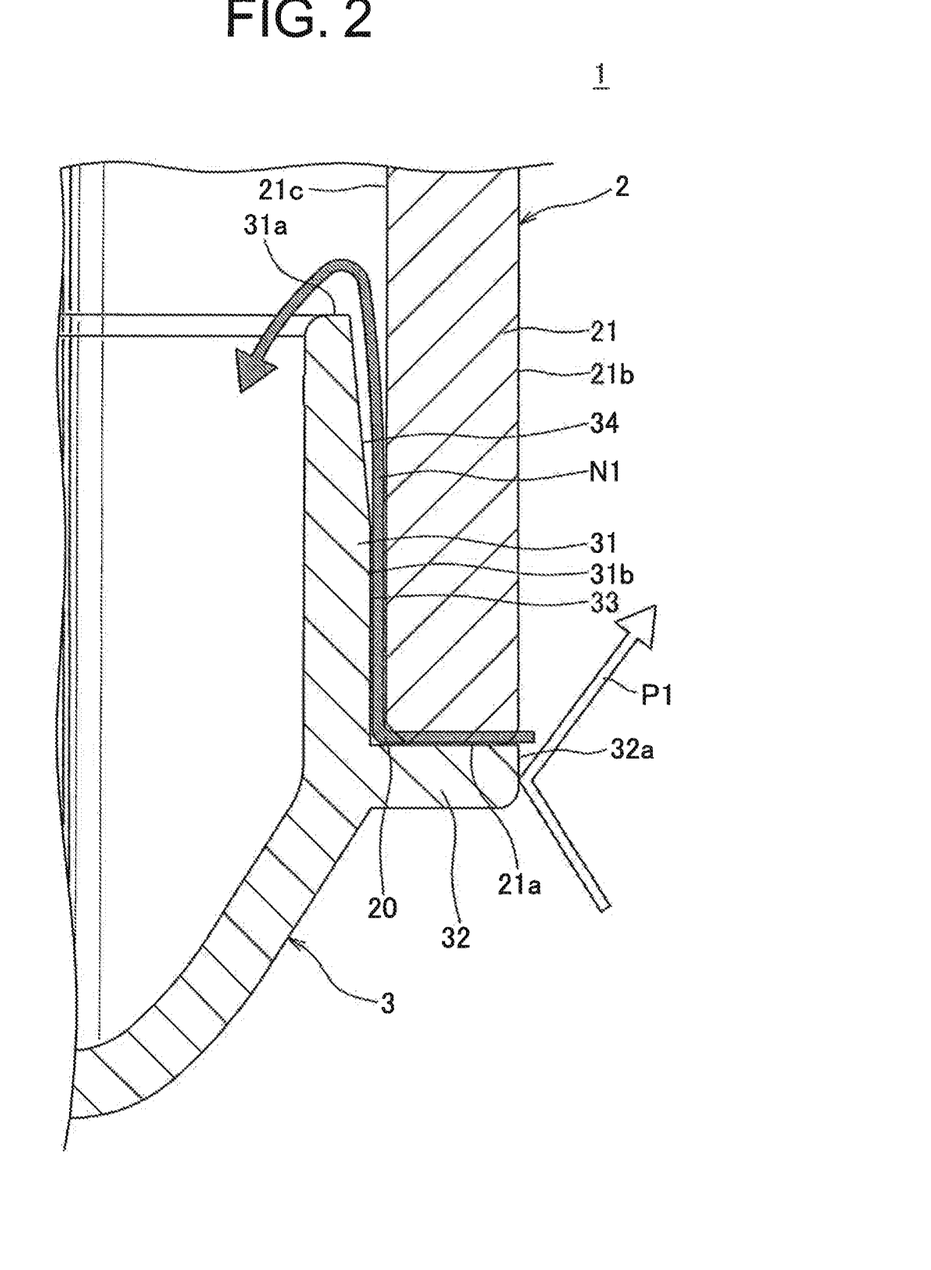
FIG. 2 is an explanatory view when highly pressured water is splayed to a case shown in FIG. 1.

With reference to FIGS. 1 and 2, an "electric junction box" relevant to the first embodiment is discussed. The electric junction box is designed to be mounted on an automobile and supply power or transmit signal to an electric device mounted on the automobile. Also, the embodiment is the one in which a frame abuts onto a flange disposed to a lower cover, and a tapered face is provided on a side wall of the lower cover above the flange.

The foregoing electric junction box is provided with a case 1 shown in FIG. 1. The case 1 includes a frame 2 to which a plurality of components is to be attached, a lower cover 3 to be attached to the frame 2 (corresponding to a "cover" in the claims), and a not-shown upper cover to be attached to the frame 2. These frame 2, lower cover 3, and upper cover are made of synthetic resin.

The frame 2 is provided with a cylindrical side wall 21 (corresponding to a first side wall in the claims, it is hereafter referred to as the first side wall), an opening 20 surrounded by a lower end 21a of the first side wall 21, and an opening surrounded by an upper end of the first side wall 21. The forgoing plurality of components, such as relay, fuse, or connector, is attached to inside the first side wall 21. Also, the upper cover is designed to cover the upper opening of the frame 2.

The lower cover 3 is designed to cover the lower opening 20 of the frame 2, and is provided with a bottom wall, a side wall 31 (corresponding to a second side wall in the claims, it is hereafter referred to as the second side wall), and a flange 32 projecting from an outer face 31b of the second side wall 31. The flange 32 is formed across a whole circumference of the second side wall 31.

An upper end 31a of the second side wall 31 of the lower cover 3 is positioned inside the first side wall 21 of the frame 2, and a lower end 21a of the first side wall 21 of the frame 2 abuts onto the flange 32 of the lower cover 3.

Also, an outer face 31b of the second side wall 31 above the flange 32 is provided with a parallel face 33 and the tapered face 34. The parallel face 33 intersects the flange 32, and is arranged in a plane parallel to an inner face 21c of the first side wall 21. The tapered face 34 is positioned upside the parallel face 33, and is slanted toward inside the second side wall 31 as approaching from an end away from the flange 32 of the parallel face 33 to the upper end 31a.

In the invention, the parallel face 33 has a length h1 from an end near the flange 32 to an end near the tapered face 34 of 3 mm or more. The tapered face 34 has a length h2 from an end near the parallel face 33 to the upper end 31a of 3 mm or more. A space g between the upper end 31a of the second wall 31 and the inner face 21c of the first side wall 21 is arranged 0.5 mm or more.

Conformation to such those dimensions, as shown by the arrow N1 in FIG. 2, makes it possible that when highly pressured water (for example, highly pressured washing water) is splayed to the case 1 and invading from between the flange 32 and the first side wall 21, a momentum of the water passing upwardly along a space between the parallel face 33 and the first side wall 21 is reduced between the tapered face 34 and the first side wall 21, and thereby the water passing through between the upper end 31a of the second side wall 31 and the first side wall 21 falls down to downside of the case 1 without splashing upwardly toward the upside of the case 1. Therefore, the water invading into the case 1 is prevented from splashing onto the components attached to the frame 2.

Namely, since the parallel face 33 is a portion which forms from the first side wall 21 a slight space, and serves as not directing toward the upper end 31a the water that invades from between the flange 32 and the first side wall 21, the parallel face 33 requires its length h1 of 3 mm or more. Note that the parallel face 33 may abut onto the first side wall 21 owing to its error within tolerance. Also, since the tapered face 34 serves as ready attachment of the lower cover 3 to the frame 2, and is a portion which forms from the first side wall 21 a space to reduce pressure, the tapered face 34 requires its length h2 of 3 mm or more, and the space g between the upper end 31a of the second side wall 31 and the inside 21c of the first side wall 21 requires 0.5 mm or more. This does not imply limiting the length h1 of the parallel face 33, h2 of the tapered face 34, and the space g1 between the upper end 31a and the first side wall 21. Note that in the embodiment the space g1 between the upper end 31a and the first side wall 21 is, in view of stiffness of the second wall 31, set to 1 mm.

Furthermore, the tip end 32a of the flange 32 away from the second side wall 31 is positioned in the same plane as the outer face 21b of the first side wall 21. It follows from this that no step is induced between the tip end 32a of the flange 32 and the outer face 21b of the first side wall 21, making it possible that the pressured water, when splayed to the case 1, unlikely invades into between the flange 32 and the first side wall 21.

Second Embodiment

Figure 3:
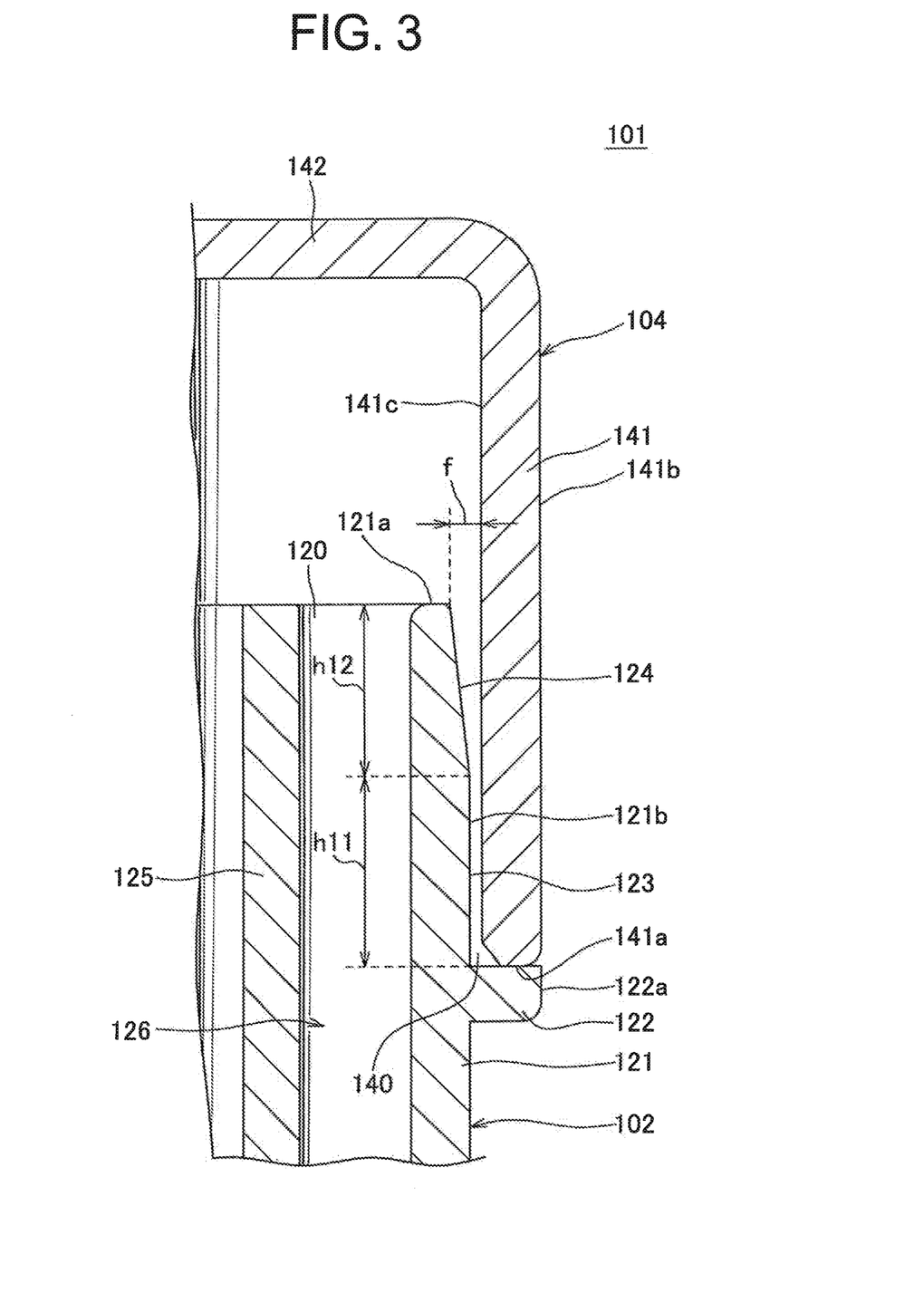
FIG. 3 is a cross-sectional view illustrating an electric junction box according to a second embodiment of the invention.
Figure 4:
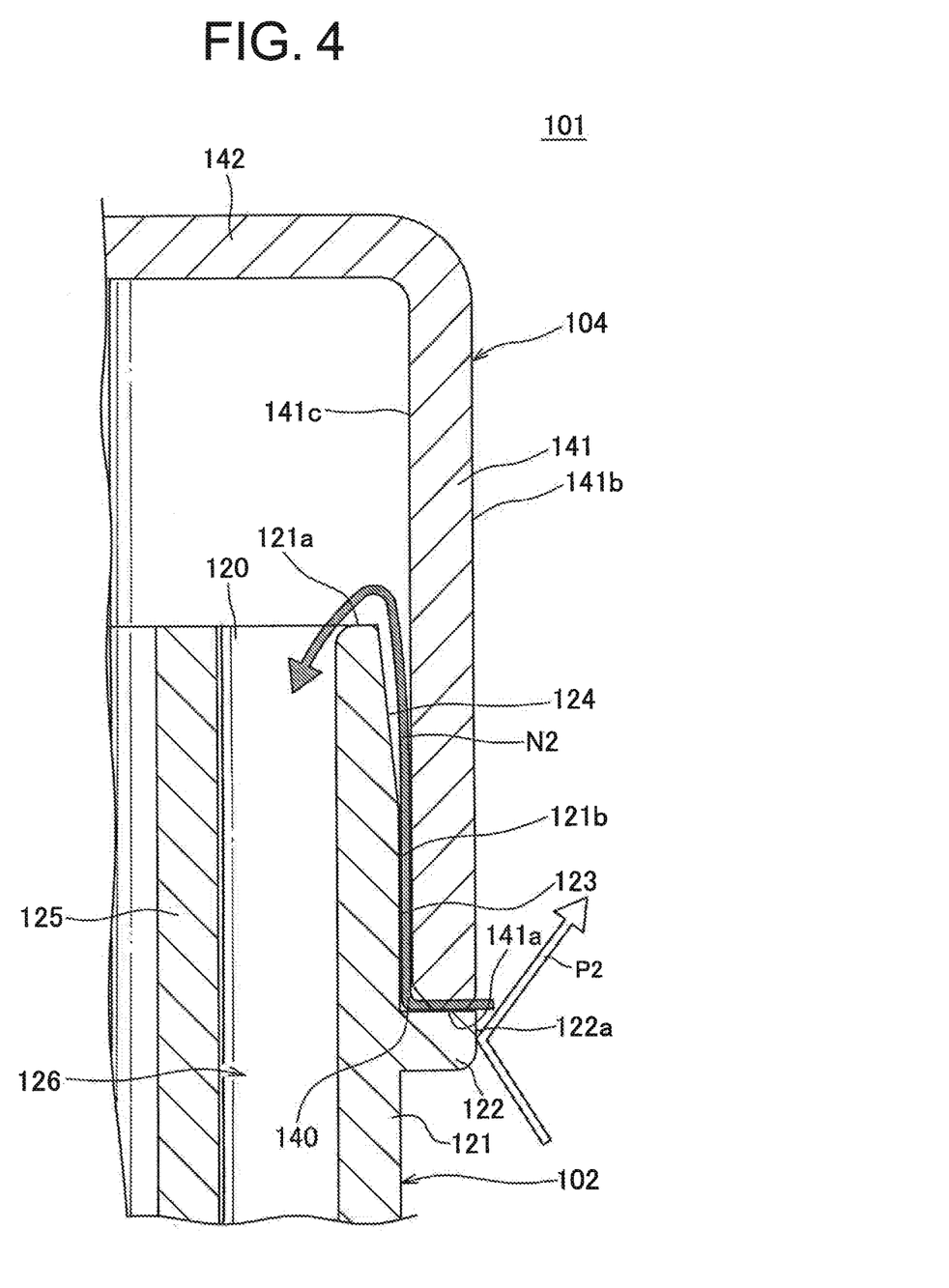
FIG. 4 is an explanatory view when highly pressured water is splayed to a case shown in FIG. 3.

With reference to FIGS. 3 and 4, an "electric junction box" according to the second embodiment is discussed. In the embodiment, an upper cover abuts onto a flange disposed to a frame and a tapered face is disposed on a frame side wall upside the flange.

The electric junction box is provided with a case 101 shown in FIG. 3. The case 101 is provided with a frame 102 to which a plurality of components is to be attached, an upper cover 104 (corresponding to a "cover" in the claims), and a not-shown lower cover to be attached to the frame 102. These frame 102, upper cover 102, upper cover 104, and lower cover are made of synthetic resin.

The frame 102 is provided with a cylindrical side wall 121 (corresponding to a second side wall in the claims, it is hereafter referred to as the second side wall), an opening 120 surrounded by an upper end 121a of the second side wall 121, and an opening surrounded by a lower end of the second side wall 121, a flange 122 projecting from an outer face 121b of the second side wall 121, and a waterproof wall 125 arranged inside the second side wall 121. The flange 122 is formed across a whole circumference of the second side wall 121. The waterproof wall 125 is spaced apart from the second side wall 121. A space between the waterproof wall 125 and the second side wall 121 is referred to as a "drainage section", and is provided with a reference sign 126. The forgoing plurality of components, such as relay, fuse, or connector, is attached to inside the waterproof wall 125. Also, the lower cover is designed to cover the lower opening of the frame 102.

The upper cover 104 is designed to cover the opening 120 upside the frame 102, which includes a ceiling wall 142, a side wall 141 (corresponding to a "first peripheral wall", and hereinafter referred to as the "first side wall"), and an opening 140 surrounded by the lower end 141a of the first side wall 141.

An upper end 121a of the second side wall 121a of the frame 102 is positioned inside the first side wall 141 of the upper cover 104, and a lower end 141a of the side wall 141 of the upper cover 104 abuts on the flange 122 of the frame 102.

Also, an outer face 121b above the flange 122 in the second side wall 121 is provided with a parallel face 123, and a tapered face 124. The parallel face 123 is the face intersecting the flange 122, and parallel to the inner face 141c of the first side wall 141. The tapered face 124 is located upside the parallel face 123, and tapered in a direction toward inside the second side wall 121 as approaching from an end of the parallel wall 123 away from the flange 122 to the upper end 121.

In the present invention the parallel face 123 has a length h11 from an end of the flange 122 to an end near the tapered face 124 of 3 mm or more. The tapered face 124 has a length h12 from an end near the parallel face 123 to the upper end 121a of 3 mm or more. A space f between the upper end 121a of the second side wall 121 and the inner face 141c of the first side wall 141 is arranged 0.5 mm or more.

Conformation to such the dimensions, as shown by the arrow N2 in FIG. 4, makes it possible that when highly pressured water (for example, highly pressured washing water) is splayed to the case 101 and invading from between the flange 122 and the first side wall 141, a momentum of the water passing upwardly through the space between the parallel face 123 and the first side wall 141 is reduced between the tapered face 124 and the first side wall 141, and thereby the water passing through between the upper end 121a of the second side wall 121 and the first side wall 141 falls down toward downside of the case 101 without splashing upwardly upside the case 101. Therefore, the water invading into the case 101 is prevented from splashing onto the components attached to inside the frame 2.

Furthermore, the tip end 122a of the flange 122 away from the second side wall 121 is positioned in the same plane as the outer face 141b of the first side wall 141. It follows from this that no step is induced between the tip end 122a of the flange 122 and the outer face 141b of the first side wall 141, making it possible that the pressured water, when splayed to the case 101, unlikely invades into between the flange 122 and the first side wall 141.

The aforementioned embodiments merely show such as, but not limited to, typical embodiment of the present invention. Namely, it is to be understood that various changes and modifications will be apparent to those skilled in the art. Therefore, unless otherwise such changes and modifications depart from the scope of the present invention hereafter defined, they should be construed as being included therein.

REFERENCE SIGNS LIST 1, 101 case
2, 102 frame
3 lower cover (cover)
21, 141 first side wall
31, 121 second side wall
32, 122 flange
34, 124 tapered face
104 upper cover (cover)

The invention claimed is:

1. An electric junction box, comprising:
   a case including
      a frame to which a plurality of components is to be attached,
      a cover arranged to be attached to the frame,
   wherein one of the frame and the cover includes
      a first side wall, and
      an opening surrounded by a lower end of the side wall,
   wherein the other of the frame and the cover includes
      a second side wall, and
      a flange projecting from an outer face of the second side wall,
   wherein an upper end of the second side wall is positioned inside the first side wall,
   wherein the lower end of the first side wall abuts onto the flange,
   wherein the outer face of the second side wall above the flange includes
      a parallel face intersecting the flange and arranged parallel to an inner face of the first side wall,
      a tapered face slanted in a direction toward an inside of the second wall as approaching the upper end of the second side wall from an end of the parallel face located distant from the flange,
   wherein the parallel face has a length from an end of the flange to an end of the tapered face of 3 mm or more,
   wherein the tapered face has a length from the end of the parallel face to an upper end of the tapered face of 3 mm or more, and
   wherein the upper end of the second wall and the inner face of the first side wall are spaced by 0.5 mm or more.

2. The electric junction box as claimed in claim 1, wherein a distal end of the flange located distant from the second side wall positioned in the same plane as an outer face of the first side wall.

* * * * *